US008621078B1

(12) United States Patent
Mukerji et al.

(10) Patent No.: US 8,621,078 B1
(45) Date of Patent: Dec. 31, 2013

(54) CERTIFICATE SELECTION FOR VIRTUAL HOST SERVERS

(75) Inventors: Arindum Mukerji, Seattle, WA (US); Jesse Abraham Rothstein, Seattle, WA (US); Tao Liu, Seattle, WA (US); Jonathan Mini, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1405 days.

(21) Appl. No.: 11/238,749

(22) Filed: Sep. 29, 2005

Related U.S. Application Data

(60) Provisional application No. 60/708,666, filed on Aug. 15, 2005.

(51) Int. Cl.
*H04L 29/06* (2006.01)

(52) U.S. Cl.
USPC .......................................... 709/225; 713/155

(58) Field of Classification Search
USPC .......................................... 709/225; 713/155
See application file for complete search history.

(56) References Cited

U.S. PATENT DOCUMENTS

| | | | |
|---|---|---|---|
| 5,319,638 A | 6/1994 | Lin | |
| 5,825,890 A | 10/1998 | Elgamal et al. | |
| 6,052,785 A | 4/2000 | Lin et al. | |
| 6,061,454 A | 5/2000 | Malik et al. | |
| 6,094,485 A * | 7/2000 | Weinstein et al. | 380/30 |
| 6,223,287 B1 | 4/2001 | Douglas et al. | |
| 6,308,277 B1 * | 10/2001 | Vaeth et al. | 726/10 |
| 6,367,009 B1 | 4/2002 | Davis et al. | |
| 6,584,567 B1 | 6/2003 | Bellwood et al. | |
| 6,643,701 B1 | 11/2003 | Aziz et al. | |
| 6,674,717 B1 | 1/2004 | Duong-van et al. | |
| 6,681,327 B1 | 1/2004 | Jardin | |
| 6,718,388 B1 | 4/2004 | Yarborough et al. | |
| 6,976,258 B1 | 12/2005 | Goyal et al. | |
| 7,099,915 B1 * | 8/2006 | Tenereillo et al. | 709/203 |
| 7,231,659 B2 * | 6/2007 | Trilli et al. | 726/3 |
| 2002/0161745 A1 | 10/2002 | Call | |
| 2003/0028762 A1 * | 2/2003 | Trilli et al. | 713/153 |
| 2003/0126431 A1 * | 7/2003 | Beattie et al. | 713/156 |
| 2003/0182423 A1 * | 9/2003 | Shafir et al. | 709/225 |
| 2004/0054793 A1 * | 3/2004 | Coleman | 709/229 |
| 2004/0236861 A1 | 11/2004 | Bondar et al. | |

(Continued)

OTHER PUBLICATIONS

Asia Pacific Network Information Centre, "Virtual web hosting FAQ", pp. 1-4, © 1999-2006, Last updated on Jul. 1, 2005. Can be found at http://www.apnic.net/info/faq/virtualwebfaq.html.

(Continued)

*Primary Examiner* — Chau Le
(74) *Attorney, Agent, or Firm* — Frommer Lawrence & Haug LLP; Jamie L. Wiegand

(57) ABSTRACT

A method, system, and apparatus are directed towards dynamically managing certificates for a virtual host server. A certificate may be uniquely associated with each of the websites hosted on the virtual host. In one embodiment, the certificate is an X.509 certificate. Also, the certificate may be managed by a network device residing between a client and the virtual host server. When the client that is browsing one of the hosted websites, the network device may store a persistence record that maps client information to the hosted website. The client may employ an SSL protocol to establish a secure connection. When a certificate associated with the hosted website is to be provided, the network device uses the persistence record to determine which hosted website the client was browsing, selects, and provides the appropriate certificate to the client.

21 Claims, 4 Drawing Sheets

(56) References Cited

U.S. PATENT DOCUMENTS

| | | | |
|---|---|---|---|
| 2005/0063303 | A1 | 3/2005 | Samuels et al. |
| 2005/0074007 | A1 | 4/2005 | Samuels et al. |
| 2005/0091310 | A1 | 4/2005 | Salomon |
| 2005/0108420 | A1 | 5/2005 | Brown et al. |
| 2005/0187979 | A1 | 8/2005 | Christensen et al. |
| 2005/0265235 | A1 | 12/2005 | Accapadi et al. |
| 2005/0289084 | A1* | 12/2005 | Thayer et al. .................. 705/67 |

OTHER PUBLICATIONS

Chao, H., et al., "Name-based Virtual Hosting in TCP", pp. 1-8, 2003. Can be found at http://www.cs.cornell.edu/boom/2003sp/ProjectArch/VirtualHostTCP/index.htm.

Dierks, T. and Allen, C., "The TLS Protocol Version 1.0", IETF, RFC 2246, pp. 1-80, Jan. 1999.

Freier, Alan, et al., "The SSL Protocol Version 3.0", IETF, Internet Draft, pp. 1-63, Nov. 18, 1996.

Housley, R. et al., "Internet X.509 Public Key Infrastructure Certificate and CRL Profile", IETF, RFC 2459, pp. 1-54, Jan. 1999.

IBM, "IP-Based Virtual Hosting must be used if configuring multiple SSL Virtual Hosts", pp. 1-3, Last modified Sep. 16, 2004. Can be found at http://www-1.ibm.com/support/docview.wss?rs=177&context=SSEQT&uid=swg21045922.

Khare, R. and Lawrence, S., "Upgrading to TLS Within HTTP/1.1", RFC 2817, pp. 1-11, May 2000. Can be found at http://www.faqs.org/rfcs/rfc2817.html.

The Apache Software Foundation, "Apache HTTP Server Version 1.3 Name-based Virtual Host Support", pp. 1-4, printed on Jan. 17, 2006. Can be found at http://httpd.apache.org/docs/1.3/vhosts/name-based.html.

The Apache Software Foundation, "Apache HTTP Server Version 2.0 SSL/TLS Strong Encryption: FAQ", pp. 1-13, © 1995-2006. Can be found at http://httpd.apache.org/docs/2.0/ssl/ssl_faq.html.

VeriSign, Inc., "Securing Shared Hosted Web Sites White Paper", VeriSign, Inc. Mountain View, CA, pp. 1-9, © 2002.

AARNet: Network: Large MTU: Programming (www.aarnetedu.au.engineering/networkdesign/mtu/programming.html), Dec. 9, 2005.

TCP/IP options for high-performance data transmission (Builder.com.com/5100-6372-1050878.html), Dec. 9, 2005.

Wireless/Networking (compnetworking.about.com/od/tcpip/l/bldef_nagle.htm), Dec. 6, 2005.

TCP. Section—Linux Programmer's Manual (7) (www.fifi.org/cgi-bin/man2html/usr/share/man/man7/tcp.7.gz), Dec. 9, 2005.

RFC 896—Congestion control in IP/TCP internetworks (www.faqs.org/rfcs/rfc896.html), Jan. 6, 1984.

RSA Laboratories. PKCS #1 v2.0: RSA Cryptography Standard, Oct. 1, 1998.

Berners-Lee et al, RFC 1945, Hypertext Transfer Protocol—HTTP/1.0, Network Working Group, May 1996.

Dierks and Allen, RFC 2246, The TLS Protocol Version 1.0, Network Working Group, Jan. 1999.

Fielding et al., RFC 2616, Hypertext Transfer Protocol—HTTP/1.1, Network Working Group, Jun. 1999.

Kessler, RFC 1739, A Primer on Internet and TCP/IP Tools, Network Working Group, Dec. 1994.

Netscape Communications Corp., "Secure Sockets Layer (SSL) version 3", Mar. 1996.

Paxson, RFC 2525, Known TCP Implementation Problems, Network Working Group, Mar. 1999.

Rescoria, "SSL and TLS—Designing and Building Secure Systems" pp. 1-46, Mar. 2001.

Nagle's Algorithm (Searchnetworking.techtarget.com/sdefinition/0..sid7gci754347.00.html), Dec. 6, 2005.

The OpenSSL Project.

HTTP/1.1 and Nagle's Algorithm (w3.org), Dec. 6, 2005.

* cited by examiner

CERTIFICATE SELECTION FOR VIRTUAL HOST SERVERS

CROSS-REFERENCE TO RELATED APPLICATIONS

This application claims the benefit of U.S. Provisional Application Ser. No. 60/708,666 entitled "SSL Certificate Selection For Virtual Host Servers," filed on Aug. 15, 2005, the benefit of the earlier filing date of which is hereby claimed under 35 U.S.C. §119 (e) and which is further incorporated herein by reference.

FIELD OF THE INVENTION

The present invention relates generally to network communications, and more particularly, but not exclusively, to a system and method for managing secure connections for a virtual host server.

BACKGROUND OF THE INVENTION

The increasing popularity of the Internet has led to the emergence of online merchants, online libraries, and even online medical and insurance businesses, along with people who wish to share information with one or more of their friends. Each of these uses of the Internet may employ a website that is configured to enable access to information by others. Each of the website owners may also desire to provide secure communications and access to at least some of the information and activities associated with their website. Moreover, for various reasons, these website owners may desire to have a domain name that is uniquely associated with their website.

Today, websites may be made available using a variety of server implementations. For example, some individuals, and businesses, may select to implement a shared server to host their website. Such shared hosting of websites, also called virtual hosting, typically employs a server that is configured to host more than one domain name while sharing computing resources, such as bandwidth, memory, or the like. Such a configuration may, depending on the speed and configuration of the server, be able to host thousands of websites, each with individual domain names, but employing the same Internet Protocol (IP) network address.

However, many implementations of virtual hosting may have problems with respect to providing secure communications between an end-user and a hosted website. For example, a traditional method of providing secure communications between the end-user employing a web browser and a website is to establish an encrypted connection. Encrypted connections may be implemented using a variety of secure communication protocols, including Secure Sockets Layer (SSL) protocol, Transport Layer Security (TLS) protocol, or the like. These protocols typically include a handshaking procedure where the website may be authenticated by the client device. In one such procedure, the server device provides a digital certificate for the website to the client device.

In a virtual hosting environment, however, the particular hosted website that is to be requested may not be known during the handshaking procedure. Thus, the virtual host server may not know which digital certificate is to be provided for authentication of the hosted website. One proposed solution has been to assign a unique IP address to each of the hosted websites. However, because of the expense of registering and maintaining such global IP addresses, as well as other reasons, this solution may not always be appropriate.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
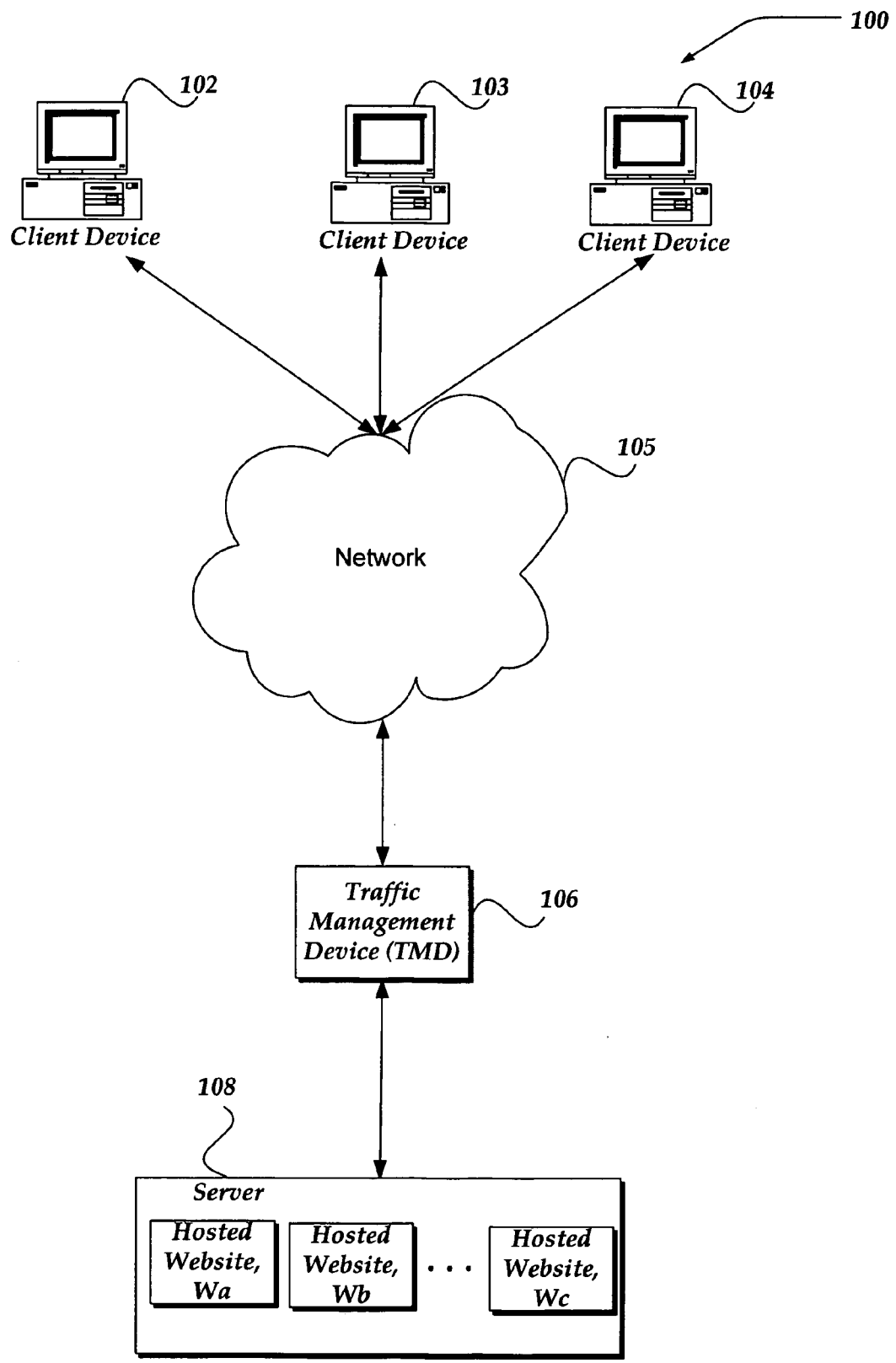
FIG. 1 shows a functional block diagram illustrating an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." As used herein, application layer refers to layers 5 through 7 of the seven-layer protocol stack as defined by the ISO-OSI (International Standards Organization-Open Systems Interconnection) framework.

Briefly stated, the invention is directed towards a system, apparatus, and method for dynamically managing certificates for websites on a virtual host server. A certificate may be uniquely associated with each of the websites hosted on the virtual host server. In one embodiment, the certificate is an X.509 certificate, such as those described in Request for Comments (RFC) 2459 available at the Internet Engineering Task Force's (IETF) website. In one embodiment, the certificates may be managed by a network device, such as a traffic management device, residing between a client and the virtual host server. When the client that is browsing one of the hosted websites opens a webpage that is configured to direct the client to establish a secure connection, the network device may store a persistence record associated with the client and the hosted website. The persistence record may include client information such as its source network address, including an IP address and/or a port address. The client may then be redirected to establish the secure connection. The redirection may include an HTTP status code that is sent by the hosted website or the traffic management device. During establishment of the secure connection, a certificate associated with the hosted website may be employed. The network device uses the persistence record to determine which hosted website the client was last browsing. The network device may then select and provide a certificate associated with the last accessed host website for use by the client to authenticate the hosted website. As used herein, it should be clear that a reference to a hosted website includes virtual hosting of any portion of a website. Moreover, although the invention is illustrated using hosted websites, the invention is not so limited. Thus, for example, the invention may be used for virtual hosted content sites, or other virtually hosted resource sites that employ a secure communication protocol using certificates, without departing from the scope or spirit of the invention.

The secure connection may be established using any of a variety of secure communications protocols that employ certificates, including SSL, TLS, or the like. The SSL protocol is described in Netscape Communications Corp, Secure Sockets Layer (SSL) version 3 (November 1996). The TLS protocol is derived from SSL, and is described in Dierks, T., and Allen, C., "The TLS Protocol Version 1.0," RFC 2246 (January 1999), is available at the IETF website. As used throughout this application, including the claims, SSL refers to SSL, TLS, and all secure communications protocols derived therefrom.

By employing the persistence record to determine the certificate to provide to the client, associated with the present invention overcomes the problem that an HTTP header indicating which URI the client is seeking to access may not be available during the establishment of the secure connection. Without such knowledge about which URI the client is seeking to access during the secure connection, it would be unclear which certificate should be presented.

Illustrative Operating Environment

FIG. 1 illustrates an environment in which the invention may operate. However, not all of these components may be required to practice the invention, and variations in the arrangement and type of the components may be made without departing from the spirit or scope of the invention.

As shown in the figure, system 100 includes client devices 102-104, network 105, traffic management device (TMD) 106, and server 108. Client devices 102-104 are in communication with TMD 106 through network 105. TMD 106 is in further communication with server 108. Also shown in the figure, server 108 includes a plurality of hosted websites Wa, Wb, and Wc. Although not shown, TMD 106 may be in communication with server 108 through a network infrastructure that is similar to network 105. For example, in one embodiment, TMD 106, and server 108 might reside within a common local area network type of infrastructure, although the invention is not constrained to such a configuration.

Generally, client devices 102-104 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-104 may also include other computing devices, such as personal computers, multiprocessor systems, microprocessor-based or programmable consumer electronics, network devices, and the like. As such, client devices 102-104 may range widely in terms of capabilities and features. For example, a client device configured as a cell phone may have a numeric keypad and a few lines of monochrome LCD display on which only text may be displayed.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message. Moreover, the browser application may be configured to communicate over network 105 using a secure connection where the content may be encrypted. Thus, in one embodiment, the browser application may be configured to employ such communications procedures (protocols), including, but not limited to, SSL, TLS, or the like, to establish a secure connection.

Client devices 102-104 also may include at least one client application that is configured to receive content from another computing device. The client application may include a capability to provide and receive textual content, graphical content, audio content, alerts, messages, and the like. Moreover, client devices 102-104 may be further configured to communicate a message, such as through a Short Message Service (SMS), Multimedia Message Service (MMS), instant messaging (IM), internet relay chat (IRC), mIRC, Jabber, and the like, between another computing device, and the like.

In one embodiment, client devices 102-104 may be configured such that an end-user may operate the computing device to make requests for data and/or services from other computers on the network. In one embodiment, client devices 102-104 may employ a network interface unit (sometimes called a transceiver), such as described below, to communicate information with another computing device. Often, the requested data resides in computing devices such as server 108. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, at least one of client devices 102-104 is a computing device that is not operated by an end-user.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

TMD 106 may include virtually any device that manages network traffic. Such devices include, for example, routers, proxies, firewalls, load balancers, cache devices, devices that perform network address translation, any combination of the preceding devices, and the like. TMD 106 may, for example, control the flow of data packets delivered to and forwarded from one or more servers, such as server 108. TMD 106 may direct a request for a resource to a particular server based on network traffic, network topology, capacity of a server, content requested, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server so that state information is maintained. TMD 106 also may support a wide variety of network applications such as Web browsing, email, telephony, streaming multimedia and other traffic that is sent in packets.

TMD 106 may receive requests from one or more of client devices 102-104. TMD 106 may select a website hosted on server 108 to forward the request. In one embodiment, each of the hosted websites may resolve to a single IP address. TMD 106 may also receive a response from the hosted website and provide the response to the requesting client device.

TMD 106 may also be configured such that a secure connection, such as an SSL connection, TLS connection, or the like, may be established between TMD 106 and one of client devices 102-104. In one embodiment, the secure connection terminates at TMD 106 rather than continue through to server 108. TMD 106 may store certificates for each of the websites virtually hosted on server 108 for use, at least in part, in establishing the secure connection. In one embodiment, the certificates are X.509 digital certificates. However, the invention is not constrained to certificates in this format, and other certificate formats may be employed, without departing from the scope or spirit of the invention.

TMD 106 may receive a request a secure webpage from one of client devices 102-104. As part of its response, TMD 106 may store information associated with a website that the requesting client device had last accessed, prior to the client device being directed to establish a secure connection. TMD 106 may also store information about the requesting client device, including a source IP address, a source port address, or the like. When the client device requests the secure connection, TMD 106 may employ the stored information to identify and provide a certificate associated with the hosted website for the secure webpage. The client may then employ the provided certificate in part to authenticate the hosted website. TMD 106 may employ a process substantially similar to that described below in conjunction with FIG. 4 to perform at least some of its actions.

TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMD 106 is network device 200 of FIG. 2, configured with appropriate software. The BIG-IP® family of traffic managers, by F5 Networks of Seattle, Wash., are examples of TMDs.

Server 108 may include any computing device capable of communicating packets with client devices 102-104 through TMD 106. Each packet may convey a piece of information. A packet may be sent for handshaking, i.e., to establish a connection or to acknowledge receipt of data. The packet may include information such as a request, a response, or the like. Generally, packets received by server 108 will be formatted according to TCP/IP, but they could also be formatted using another transport protocol, such as User Datagram Protocol (UDP), Internet Control Message Protocol (ICMP), NETbeui, IPX/SPX, token ring, and the like. Moreover, the packets may be communicated between server 108, TMD 106, and client devices 102-104 employing HyperText Transfer Protocol (HTTP), HTTPS, and the like.

In one embodiment, server 108 is configured to operate as a virtual host web server. That is, server 108 is configured to host more than one domain name or website, each using the same IP address. As shown, server 108 is virtually hosting websites, Wa, Wb, and Wc. However, the number of websites that server 108 is not constrained to three and more or less websites may be virtually hosted by server 108, without departing from the scope of the invention. Moreover, at least one of the hosted websites includes a webpage that is configured such that communications with it are, at least in part, through a secure connection over a network.

However, server 108 is not limited to web servers, and may also operate a messaging server, a File Transfer Protocol (FTP) server, a database server, content server, and the like. Additionally, server 108 may be configured to perform different operations. Thus, for example, server 108 may be configured as a messaging server, and a database server. Thus, at least one of websites Wa, Wb, or Wc may represent other than a website. Moreover, while server 108 may operate as other than a website, it may still be enabled to receive an HTTP communication.

Devices that may operate as server 108 includes personal computers, desktop computers, multiprocessor systems, microprocessor-based or programmable consumer electronics, network PCs, servers, and the like.

Although the above configuration illustrates certificate management and secure connection termination actions being performed within TMD 106, the invention is not so limited. Thus, in one embodiment, the certificate management and secure connection termination actions may also be performed within server 108, be distributed across server 108 and TMD 106, or even be distributed across another network device, without departing from the scope or spirit of the invention.

Moreover, while only a singular server is illustrated in communication with TMD 106, the invention is not so constrained. For example, a plurality of servers may be in communication with TMD 106. Each of the servers in the plurality may in turn operate as a virtual host server, and/or provide other services as described above in conjunction with server 108.

Illustrative TMD Environment

Figure 2:
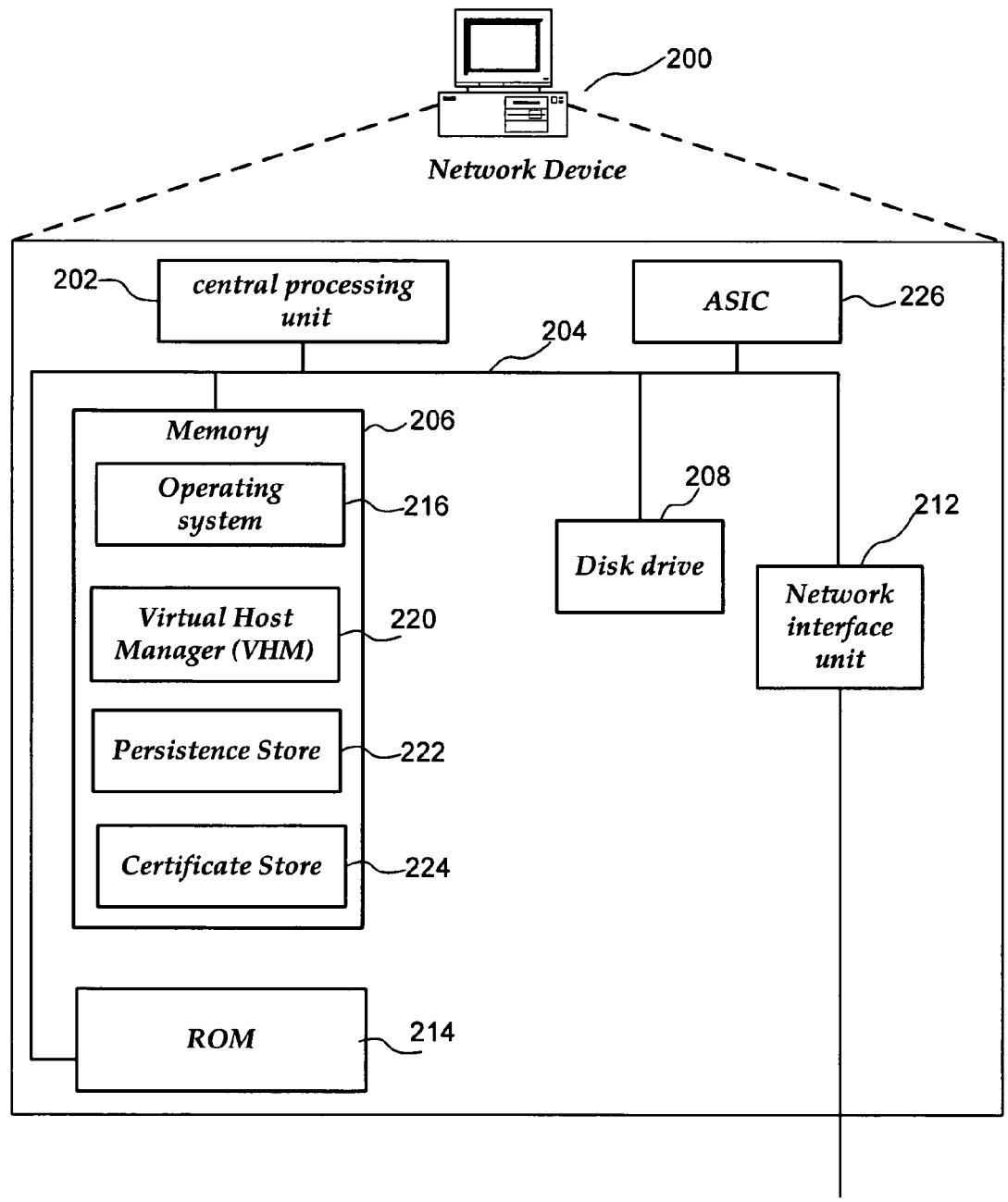
FIG. 2 shows one embodiment of a network device that may be included in a system implementing the invention.

FIG. 2 shows an exemplary network device 200 that may operate as TMD 106 of FIG. 1. It will be appreciated that not all components of network device 200 are illustrated, and that network device 200 may include more or less components than those shown in FIG. 2.

As illustrated in FIG. 2, network device 200 includes a central processing unit (CPU) 202, mass memory, and a network interface unit 212 connected via a bus 204. Network interface unit 212 includes the necessary circuitry for connecting network device 200 to various networks, including network 105 of FIG. 1, and is constructed for use with various communication protocols including the TCP/IP and UDP/IP protocol. Network interface unit 212 may include or interface with circuitry and components for transmitting messages and data over a wired and/or wireless communications medium. Network interface unit 212 is sometimes referred to as a transceiver, Network Interface Card (NIC), or the like.

In one embodiment, network device 200 includes one or more Application Specific Integrated Circuit (ASIC) chip 226 connected to bus 204. As shown in FIG. 2, network interface unit 212 may connect to 204 bus through at least one ASIC chip. ASIC chip 226 can include logic that enables at least some of the actions of network device 200. For example, in one embodiment, ASIC chip 226 can be employed to perform packet processing functions on incoming and/or outgoing packets. In one embodiment, ASIC chip 226 performs logic for network monitor 220 and/or redirect coordinator 224. In one embodiment, network device 200 includes one or more field-programmable gate arrays (FPGA) (not shown), instead of, or in addition to, ASIC chip 226. A number of actions for the network device can be performed by ASIC chip 226, an FPGA, CPU 202 with instructions stored in memory, or any combination of actions performed by the ASIC chip, FPGA, and CPU.

Computer storage media may include volatile and nonvolatile, removable and non-removable media implemented in any method or technology for storage of information, such as computer readable instructions, data structures, program modules or other data. Examples of computer storage media include RAM 206, ROM 214, EEPROM, flash memory and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device.

Network device 200 may also include an input/output interface (not shown) for communicating with external devices or users.

Network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in the chassis.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, Windows™, or the like. In one embodiment, the mass memory may store program code and data for implementing Virtual Host Manager (VHM) 220, persistence store 222, and certificate store 224.

Figure 3:
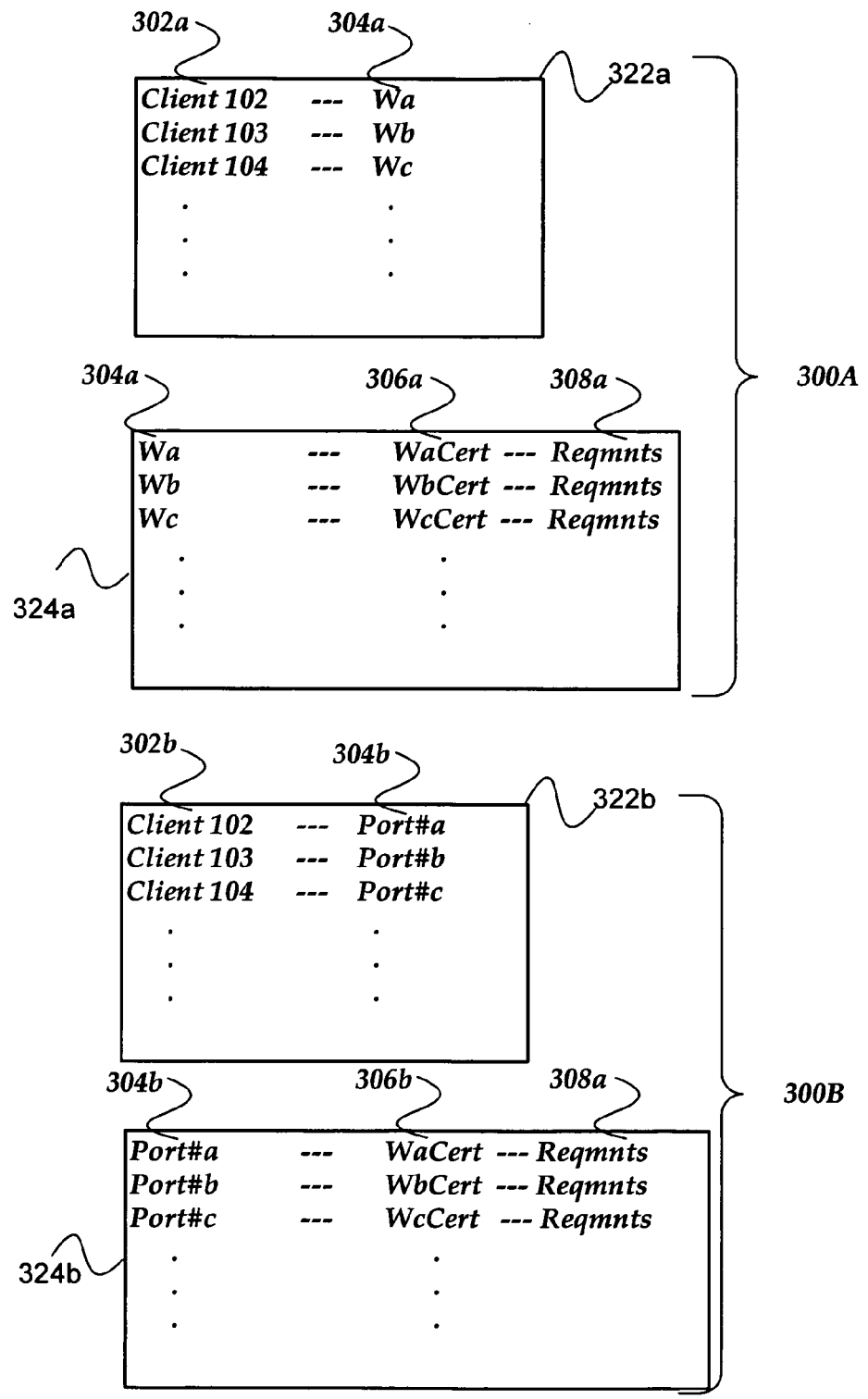
FIG. 3 shows example embodiments of persistence stores and certificate stores useable for practicing the invention.

Certificate store 224 is configured to store and manage certificates associated with each of the websites or domain names hosted on a virtual host server, such as server 108 of FIG. 1. The certificates may include any of a variety of formats. For example, in one embodiment, the certificates employ the X.509 digital certificate format. Example embodiments of certificate store 224 are illustrated in FIG. 3, described further below.

Persistence store 222 is configured to store and manage information about a client device and which hosted website the client device last accessed. The information about the client may include any of a variety of information, including but not limited to a source IP address, a source port number, or the like. The information about which hosted website was last accessed may include a Universal Resource Indicator (URI) associated with the hosted website, a domain name, a port number associated with the hosted website, or the like. Moreover, the information included for the hosted website is sufficient to enable a mapping between the website and its certificate stored in certificate store 224. Example embodiments of persistence store 222 are illustrated in FIG. 3, described further below.

VHM 220 is configured to manage, in part, the selection of a certificate for use in establishing a secure connection. When a client device, such as client devices 102-104 of FIG. 1, sends a request for a secure webpage hosted on a virtual host server, VHM 220 determines which hosted website the client device is currently accessing. This may be determined, for example, by examining a URI request from the client device. VHM 220 may also examine various network information to determine an IP address, a port address, and the like, associated with the client device. VHM 220 may store the last accessed hosted website information, and client information in persistence store 222. VHM 220 may then provide a redirect message to the client device that directs the client device to initiate a secure connection. In one embodiment, the redirect message may include a 301, or 302 HTTP redirect status code, or the like. Such redirects may also include a URI to which the client is redirected.

In one embodiment, when the client device 'calls back' requesting a secure connection, it may employ an HTTPS protocol command, requesting that an SSL, TLS, or similar, secure connection be established. The request may employ, for example, an SSL handshake protocol.

As an example, one embodiment of an SSL handshake protocol is herein described. The example, however, is not intended to limit the invention. Such example SSL handshake protocol may include a sequence of communications, typically starting with an initial connection phase where both parties (the client device and network device 200) communicate 'hello' messages. In one embodiment, the client device initiates the handshake sequence by sending a CLIENT-HELLO message. Network device 200 may receives the CLIENT-HELLO message, process it, and respond with a SERVER-HELLO message. As part of the SERVER-HELLO message VHM 220 may select and provide a certificate associated with the hosted website that the client device last accessed. VHM 220 may determine the appropriate certificate by receiving client information associated with the CLIENT-HELLO message, such as an IP address, port number, or the like. VHM 220 may then employ the client information to search persistence store 222 for the certificate associated with the hosted website the client device last accessed. VHM 220 may then provide the identified certificate for use in establishing the secure connection. To complete the SSL handshake, the client device, may generate a master key using information in the SERVER-HELLO message, and provide the master key to network device 200 in a CLIENT-MASTER-KEY message. Network device 200 may then send a SERVER-VERIFY message to the client device to enable the client device to authenticate network device 200.

Although the SSL handshake protocol has been described, it should be clear that the invention is not limited to the SSL handshake protocol, and any of a variety of other protocols that may employ a 'server-side' certificate to establish a secure connection may be employed, without departing from the scope or spirit of the invention. In any event, VHM 220 may employ a process substantially similar to that described below in conjunction with FIG. 4 to perform at least some of its actions.

In one embodiment, multiple client devices may employ a same source IP address. This may arise, for example, during a network address translation, use of a connection pool, or the like. In such situations, VHM 220 may also store information such as a port address associated with the hosted website that the client device last accessed. In this manner, each hosted website or domain name may have associated with it a unique port number. Thus, VHM 220 may employ destination port numbers to identify a website and to select and provide the appropriate certificate.

FIG. 3 shows several embodiments of persistence stores and certificate stores that may be employed in the present invention. As shown, two possible embodiments are illustrated, stores 300A and stores 300B. Stores 300A include persistence store 322*a* and certificate store 324*a*, while stores 300B include persistence store 322*b* and certificate store 324*b*.

Persistence store 322*a* illustrates a mapping between client information 302*a* and a virtual hosted website's information 304*a*. Such client information is typically that information discernable prior to an SSL handshake. For example, as noted above, the client information may include source IP address, source port number, or the like. The client information may also include an IP Time To Live (TTL), TCP options useable at a session establishment time, a TCP timestamp advertised by a peer, or the like. Virtual hosted website's information 304*a* may be a URI, domain name, or the like.

Client information 302*a* may be mapped to virtual hosted website 304*a*'s information, when a client device seeks, for example, access to a secure webpage, source, or the like.

Certificate store 324*a* illustrates a mapping between virtual hosted website's information 304*a* and a digital certificate 306*a* that is associated with the virtual hosted website. As stated above, one embodiment of digital certificate 306*a* is an X.509 certificate.

In one embodiment, of the invention, certificate store 324*a* may also include requirements (reqmnts) 308*a* that indicate, a variety of requirements, and/or additional information associated with usage of the digital certificate. For example, in one embodiment, requirements 308*a* may indicate whether virtual hosted website 304*a* may request a client-side certificate during a secure communications handshake. Persistence store 322*b* illustrates another embodiment of a mapping between client information 302*b* and a virtual hosted website's information 304*b*. As noted above, client information 302*b* may include any of a variety of information, including source IP address, source port number, or the like. Virtual hosted website's information 304*b* as illustrated may represent a port number associated with a virtual hosted website. Client information 302*b* may be mapped to virtual hosted website 304*b*'s information, when a client device seeks, for example, access to a secure webpage, source, or the like. Moreover, certificate store 324*b* illustrates a mapping between virtual hosted website's information 304*b* and a digital certificate 306*b* that is associated with the virtual hosted website. Certificate store 324*b* may further include requirements (reqmnts) 308*b* that indicate, a variety of requirements, and/or additional information associated with usage of the digital certificate.

Generalized Operation

Figure 4:
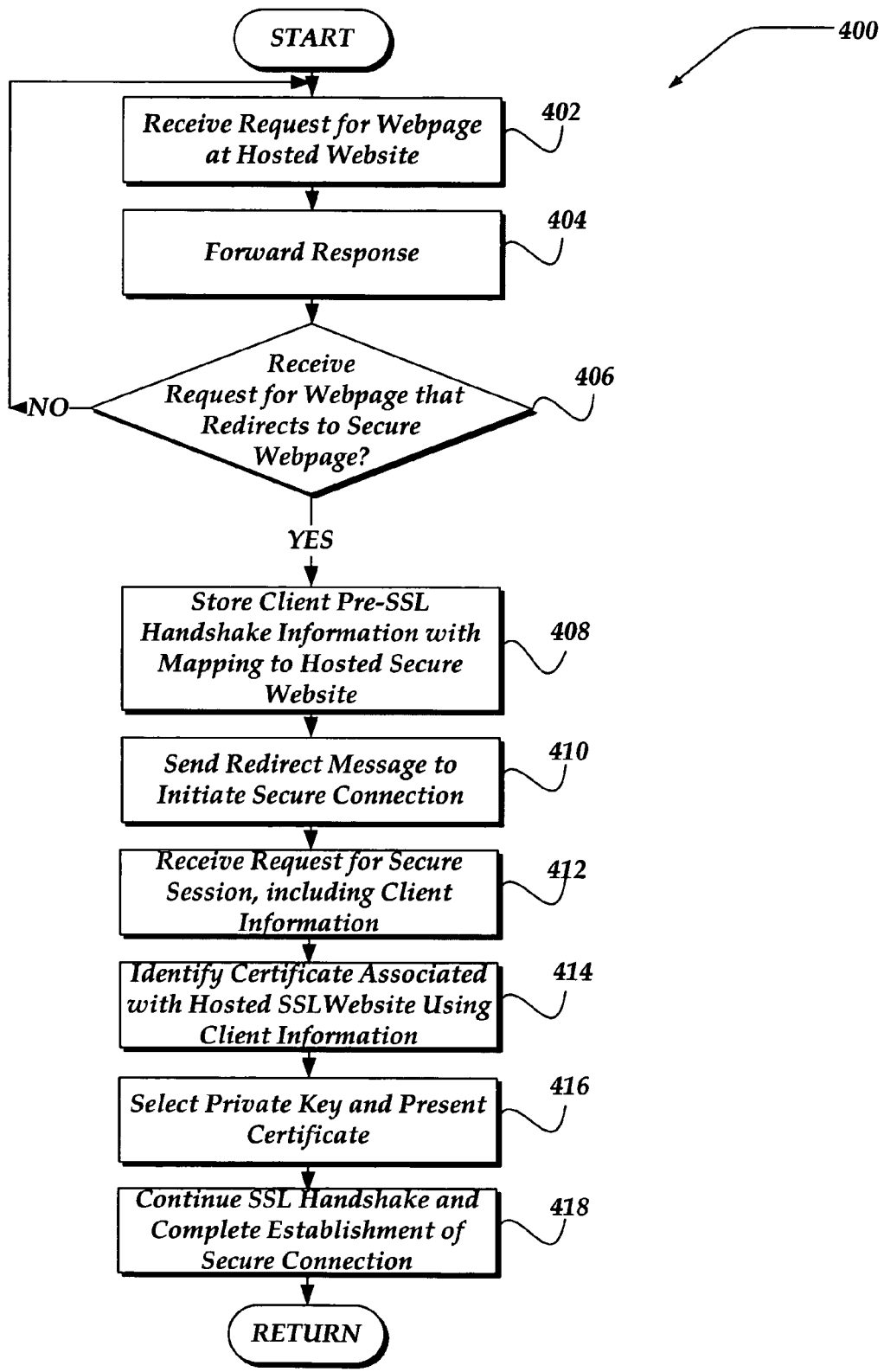
FIG. 4 illustrates a logical flow diagram generally showing one embodiment of a process for managing a digital certificate for a virtual host device, in accordance with the present invention.

The operation of certain aspects of the invention will now be described with respect to FIGS. 4. Process 400 may be implemented, for example, within TMD 106 of FIG. 1.

Process 400 begins, after a start block, at block 402, where a request is received. In one embodiment, the request is an HTTP request for a webpage that is hosted on a virtual host server. This request may be forwarded by the TMD to the hosted website for which the requested webpage is associated. In one embodiment, a table mapping is employed to determine the address of the hosted website so that the request may be then forwarded by the TMD. Processing then continues to block 404, where a response to the request is forwarded to the requesting client. In one embodiment, the response is received from the virtual host server, and forwarded to the requesting client. Processing then continues to decision block 406, where a determination is made whether a request is received from the client indicating intent to access a secure webpage. This may take the form of a request for a webpage that is configured to direct the client to a secure webpage on the virtual host. In one embodiment, the request from the client includes a URI that the server or TMD associates with a response that directs the client to a secure webpage. In one embodiment, the request received at block 402 and the request at block 406 may be the same request. In another embodiment, the requests are different requests. In one embodiment, the webpage configuration includes an HTTP redirect instruction, which may be a META refresh HTML tag or an HTTP 301 or 302 status flag that is returned. In one embodiment, the virtual host server may provide the TMD with indication that the hosted webpage is secure; however, indication that the hosted webpage is secure may be obtained using a variety of other mechanisms. For example, in one embodiment, the client makes a request to a webpage that is arranged to redirect the client to the secure webpage. In any event, if a request for a secure webpage is not received, processing loops back to block 402. However, if such a request is received processing flows to block 408. It is noted, that although it is not illustrated, the client may select at any time to exit process 400 without requesting a secure webpage, requesting another webpage, or the like.

In any event, if processing flows to block 408, information about the website for which the client is currently accessing is obtained. As described above, this information includes the application layer information (sometimes referred to as post-SSL-handshake information), such as the domain name or the URI, which then may be used to drive the decision to present a particular SSL certificate later on. In one embodiment, a key to this table might comprise pre-SSL handshake information, for example the IP address, source port number, or the like. For example, in one embodiment, such information may be stored with a specifiable client source address mask, or the like. Storing of the mask, or the like, is directed towards managing of mega-proxies that may proxy clients through a series of changing source addresses. In one embodiment, a destination port number associated with the hosted domain name (hosted website) may also be stored. In one embodiment, the client information is stored within a persistence store with the mapping to the information for the hosted secure website that the client may be redirected towards. The client information and mapping may then be used later to locate the domain name associated with the last accessed website for the client.

In one embodiment, the TMD receives from the client a request for a webpage having one or more links to a secure resource associated with the virtual host server. In response to receiving this request, the TMD sends to the client the webpage. After determining that the webpage includes at least one link to the secure resource associated with the virtual host server, the TMD stores the information about the website, described above.

Process 400 continues next to block 410, where a redirect message may be sent to the client that indicates that the client is to 'call back', requesting that a secure connection be established. The redirect message may explicitly include the original IP address that the client used to access the server. In one embodiment, the redirect is in the form of an HTTP status code, such as 301, or 302. However, the invention is not so constrained, and other forms of redirection messages may be employed that direct the client to request the secure connection. Processing then proceeds to block 412, where the client 'calls back' requesting the secure connection be established. In one embodiment, the 'call back' is in the form of an HTTPS protocol prompt that requests initiation over port 443. Such 'call back' is directed at initiating the SSL handshake, or a similar process. Thus, in one embodiment, the 'call back' initiates a CLIENT-HELLO message. The CLIENT-HELLO message may have associated with it client information, such as the client's source IP address, source port number, or the like. Typically, the client information used to determine the appropriate certificate may not be present in the CLIENT-HELLO, but may be incidentally carried along in packet frames used to transport the CLIENT-HELLO. In one embodiment, the message also includes a destination port number for the hosted website. In any event, the client information sought is the client information that was obtained above, at block 408.

Process 400 proceeds next to block 414, where a determination is made using, in part, the client information to locate the hosted website that the client last accessed. In one embodiment, a destination port number may be employed to locate the hosted website. Once the hosted website that was last accessed is identified, a certificate associated with the hosted secured website may be located and retrieved. In one embodiment, the certificate is located within a store using the client information as a sort key. Processing continues to block 416, where the certificate may then be presented to the client, in part, for use in authentication of the hosted secure website. In one embodiment, the certificate is provided to the client during the SSL/TLS handshake, as part of the SERVER-HELLO message. Process 400 continues next to block 418, where the SSL handshake is completed to establish the secure connection. Process 400 then returns to a calling process to perform other actions. Such other actions may include, for example, sending and receiving communications between at least the TMD and the client using the secure connection.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the

What is claimed as new and desired to be protected by Letters Patent of the United States is:

1. A traffic management device for managing a secure communication over a network, comprising:
   a transceiver to send and receive data over the network;
   a certificate store that is configured to store a plurality of certificates, each certificate being associated with a different virtual hosted website in a plurality of virtual hosted websites; and
   a central processing unit (CPU) having a virtual host management component that is programmed to perform actions comprising:
      receiving from a client a first request for a secure resource that is hosted on a first virtual hosted website, wherein the first virtual hosted website is hosted at a network device other than at the traffic management device;
      determining which virtual hosted website the client is currently accessing over the network;
      storing information about the client and about the determined first virtual hosted website for which the client is currently accessing;
      receiving from the client a second request to establish a secure connection with the first virtual hosted website;
      employing the stored information about the client and the determined first virtual hosted website to identify a certificate associated with the first virtual hosted website that the client last accessed from the plurality of certificates; and
      providing to the client the certificate to enable the client to authenticate the first virtual hosted website and for use in establishing the secure connection.

2. The traffic management device of claim 1, wherein the secure connection is established using an SSL handshake protocol.

3. The traffic management device of claim 1, wherein client information includes at least a source IP address, or a source port number associated with the client.

4. The traffic management device of claim 1, wherein receiving from the client the second request further comprises receiving a CLIENT-HELLO message.

5. The traffic management device of claim 1, the actions further comprising:
   after receiving the first request, sending to the client a redirect message.

6. The traffic management device of claim 5, wherein the redirect message further includes an HTTP redirect status code and a URI.

7. The traffic management device of claim 1, the actions further comprising:
   after receiving the first request, sending to the client an instruction directing the client to establish the secure connection.

8. The traffic management device of claim 1, wherein the first request comprises a request for a webpage that includes a link to the secure resource.

9. The traffic management device of claim 1, wherein receiving the request to establish a secure connection further comprises receiving an HTTPS protocol message.

10. A method operating on a network device for managing a secure communication over a network, comprising:
    receiving, from a client, a request to access a resource at a virtual hosted website;
    receiving from the client another request to access a secure resource that is hosted on the virtual hosted website;
    storing information about the client and about the virtual hosted website;
    sending to the client a request to call back to establish a secure connection with the virtual hosted website;
    receiving, from the client, a request to establish the secure connection with the virtual hosted website;
    employing the stored information about the client and the determined virtual hosted website to identify a certificate associated with the virtual hosted website; and
    providing, by the network device, to the client the certificate to enable the client to authenticate the virtual hosted website and establish secure connection.

11. The method of claim 10, further comprising in response to receiving the request to access a resource, sending to the client a URI associated with the secure resource.

12. The method of claim 10, further comprising:
    in response to receiving the request to access a resource, sending to the client a redirect message associated with the secure resource.

13. The method of claim 10, further comprising:
    in response to receiving the request to access a resource, sending to the client a web page having a link associated with the secure resource.

14. An apparatus for managing a secure communication between a client and a virtual hosted website over a network, comprising:
    a transceiver to send and receive data over the network;
    program code that receives from the client a first request to access a resource at the virtual hosted website, and stores information about the client and the virtual hosted website;
    program code that receives from the client a second request to establish a secure connection to access content that is hosted on the virtual hosted website;
    means for identifying a certificate associated with the virtual hosted website based on the first request and the stored information about the client and the virtual hosted website; and
    program code that provides to the client the determined certificate such that the client employs the certificate to authenticate the virtual hosted website and establish the secure connection.

15. The apparatus of claim 14, wherein the means for determining a certificate stores information associating the first request with the virtual hosted website.

16. The apparatus of claim 14, wherein the means for determining a certificate stores information associating the client with the virtual hosted website.

17. The apparatus of claim 14, wherein the means for determining a certificate includes program code for performing actions comprising:
    in response to the first request, storing information associating the client with the virtual hosted website; and
    in response to the second request, retrieving the stored information and employing the stored information to determine the certificate.

18. The apparatus of claim 14, further comprising program code that, in response to the receiving the first request, sends the client an instruction to establish the secure connection.

19. A system for managing secure communications between a client device and a plurality of virtual hosted websites, each of the virtual hosted websites having an individual domain name and a shared network address, the system comprising:

a first network device between the client device and the plurality of virtual hosted websites, wherein each of the plurality of virtual hosted websites are hosted on at least one other network device other than the first network device, the first network device, comprising:

a processor having:
- program code that receives requests for resources, each request including application layer information that is stored with information about one of the virtual hosted websites;
- program code that receives a request to establish a secure connection to access content that is hosted on one of the virtual hosted websites; and
- means for, in response to receiving the request to establish the secure connection, identifying a certificate associated with the one of the virtual hosted websites based on stored application layer information and stored information about the one of the virtual hosted websites from a previous request for a resource and providing the certificate to the client device such that the client device uses the provided certificate to authenticate the virtual hosted website associated with the certificate and establish the secure connection.

20. The system of claim 19, wherein the means for determining the certificate is further based on a source address included in the previous request for the resource.

21. The system of claim 19, wherein the means for determining the certificate comprises program code that associates a source address included in the previous request for the resource and the application layer information with the request to establish the secure connection.

* * * * *